United States Patent [19]

Momose

[11] Patent Number: 5,075,784
[45] Date of Patent: Dec. 24, 1991

[54] FACSIMILE APPARATUS CAPABLE OF TRANSMITTING AT AN OPTIMUM RESOLUTION

[75] Inventor: Masanori Momose, Yokohama, Japan

[73] Assignee: Canon Kabushiki Kaisha, Tokyo, Japan

[21] Appl. No.: 542,711

[22] Filed: Jun. 25, 1990

[30] Foreign Application Priority Data

Jun. 28, 1989 [JP] Japan .................................. 1-163860

[51] Int. Cl.$^5$ ............................................. H04N 1/40
[52] U.S. Cl. ..................................... 358/447; 358/448
[58] Field of Search ......................... 358/445, 447, 462

[56] References Cited

U.S. PATENT DOCUMENTS

| | | | |
|---|---|---|---|
| 4,663,662 | 5/1987 | Sekizawa | 358/447 |
| 4,772,955 | 9/1988 | Kurahayashi et al. | 358/257 |
| 4,791,678 | 12/1988 | Iwase et al. | 358/447 |
| 4,796,092 | 1/1989 | Ogata | 358/261.1 |
| 4,814,890 | 3/1989 | Kato | 358/280 |
| 4,845,569 | 7/1989 | Kurahayashi et al. | 358/400 |
| 4,868,671 | 9/1989 | Murakami | 358/447 |

*Primary Examiner*—Stephen Brinich
*Attorney, Agent, or Firm*—Fitzpatrick, Cella, Harper & Scinto

[57] ABSTRACT

A facsimile apparatus according to the present invention is arranged to evaluate the density of an original image to be transmitted and/or the resolution of a communication installed on the reception side, determine a resolution for transmission on the basis of the result of the evaluation, and transmit the image at such a resolution. Accordingly, it is possible to transmit the image at an optimum resolution which corresponds to the resolution of the communication device installed on the reception side and/or the density of the original image.

10 Claims, 10 Drawing Sheets

FACSIMILE APPARATUS CAPABLE OF TRANSMITTING AT AN OPTIMUM RESOLUTION

BACKGROUND OF THE INVENTION

1. Field of the Invention

The present invention relates to a facsimile apparatus capable of transmitting an original image at an optimum resolution which corresponds to the density of the original image to be transmitted.

2. Description of the Related Art

In a conventional type of facsimile apparatus, an operator determines whether the density of an original image to be transmitted is high or low prior to its transmission. If the operator determines that the original image has a high density, he selects, for example, a fine mode, causing the facsimile apparatus to read the original image and transmit it at the corresponding resolution. In a case where the density of the original image is low, even if the original image is transmitted in a standard mode, the image received on a reception side retains sufficient resolution. For this reason, it is generally preferred that such an original image be transmitted in the standard mode since the time required for transmission as well as communication costs can be reduced. If a plurality of originals are to be transmitted, the operator has to determine whether the density of each original image is high or low, and must change reading resolutions before executing the operation of reading each original image. Then an original comprised of sentences composed of large characters, can be read in the standard mode, while an original containing a precise drawing can be read in, for example, a fine mode.

Because the operator needs to determine the reading resolution before transmission, the conventional arrangement described above has the following disadvantages:

(1) It is time-consuming to determine the resolution at which an original image should be read during transmission.

(2) If a plurality of originals are to be transmitted, the operator must determine and set the reading resolution over and over again in accordance with the density of each original image.

(3) Since the setting of the resolution is dependent upon the decision of each operator as described above, the subjectivity of different operators result in different settings. For example, an original whose resolution can be completely processed in the fine mode may be transmitted in the ultra fine mode; otherwise, an original which is preferably transmitted in the ultra fine mode may be transmitted in the standard mode As a result, an original image with a satisfactory quality may not be transmitted to a communication device installed on a reception side, and communication costs may increase.

SUMMARY OF THE INVENTION

It is therefore an object of the present invention to provide a facsimile apparatus capable of determining the density of an original image to be transmitted and transmitting the original image at an optimum resolution corresponding to the density.

It is another object of the present invention to provide a facsimile apparatus capable of transmitting an original image at an optimum resolution corresponding to the resolution of a communication device installed on a reception side.

To achieve the above objects, according to one aspect of the present invention, there is provided a facsimile apparatus which comprises: inputting means for inputting an original image at a maximum transmittable resolution; storage means for storing image data inputted from the inputting means; density determining means for determining the density of the image data stored in the storage means; and transmitting means for transmitting the degree of resolution based on the density. The facsimile apparatus is capable of determining the density of an original image to be transmitted and transmitting it at an optimum resolution corresponding to the density.

The facsimile apparatus according to the present invention may further comprise resolution determining means for determining the maximum resolution of a communication device installed on a reception side. The transmitting means is arranged to transmit the image data to the communication device at a resolution based on the density of the image data determined by the density determining means and the maximum resolution of the communication device determined by the resolution determining means, whereby transmission can be effected with an optimum resolution corresponding to the resolution of the communication device installed on the reception side.

According to another aspect of the present invention, there is provided a facsimile apparatus which comprises: reading means for reading an original image at a maximum transmittable resolution; determining means for making a decision as to whether image data read by the reading means is coarse or dense; detecting means for detecting a resolution which can be processed by a communication device on a reception side; and transmitting means for converting the resolution of the image data read by the reading means on the basis of the result of the decision made by the determining means and the resolution detected by the detecting means and then transmitting the image data with the converted resolution. The facsimile apparatus is capable of transmitting an original image at an optimum resolution corresponding to the density of the original to be transmitted and the resolution of the communication device installed on the reception side.

The above and other objects, features and advantages of the present invention will be apparent from the following description of preferred embodiments of the invention with reference to the accompanying drawings.

DESCRIPTION OF THE PREFERRED EMBODIMENTS

Preferred embodiments of the present invention will be explained in detail below with reference to the accompanying drawings.

Figure 1:
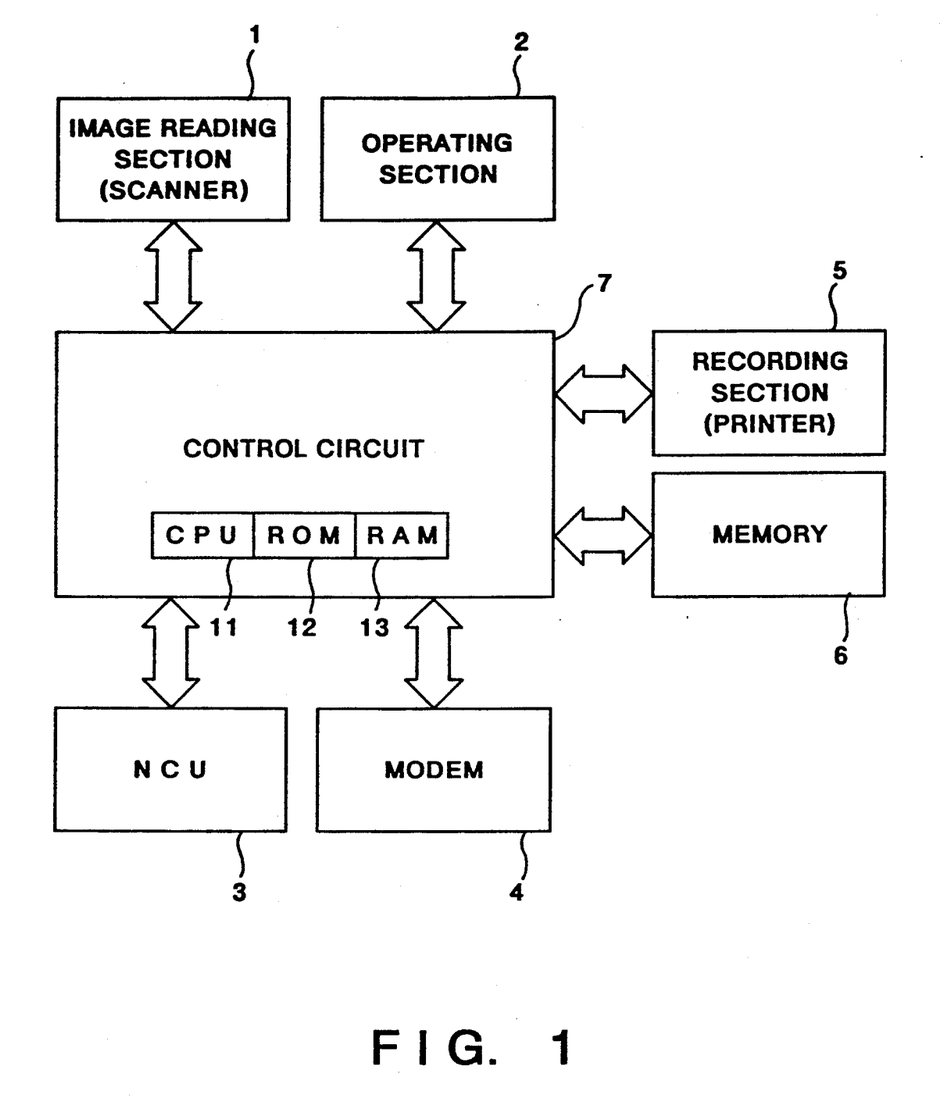
FIG. 1 is a block diagram schematically showing an embodiment of a facsimile apparatus according to the present invention.

Facsimile Apparatus (FIG. 1)

FIG. 1 is a block diagram schematically showing a first embodiment of a facsimile apparatus according to the present invention.

Referring to FIG. 1, the illustrated facsimile apparatus includes an image reading section 1 capable of reading an original image at the degree of resolution which corresponds to an ultra fine mode representing the highest pixel density during transmission or copying. Also included is an operating section 2, which is used to specify the operation required for transmission or reception, and which can be used to enter the telephone numbers of predetermined destinations. Although not shown, operating section 2 is provided with a display, such as a liquid-crystal display, for displaying a message to an operator. The facsimile apparatus also has a network control unit (NCU) 3 which controls the processes of transmitting and receiving data to and from a communication line, and a modem 4 arranged to demodulate an analog signal received from the NCU 3 into a digital signal or to modulate a digital signal into an analog signal and transmit the analog signal to the NCU 3.

The facsimile apparatus also includes a memory 6 which stores image data demodulated by the modem 4 and processed by a control circuit 7, a recording section 5 arranged to receive from the control circuit 7 the image data stored in the memory 6 and record them on a recording medium (not shown), the control circuit 7 for controlling all the elements contained in the facsimile apparatus, a CPU 11 such as a microprocessor, a ROM 12 which stores various data and a control program for the CPU 11, a RAM 13 which is used as a work area by the CPU 11, and the like.

Transmission Processing (FIG. 2)

FIG. 2 is a flowchart showing an original-image transmitting process which is executed by the above-described embodiment of the facsimile apparatus. This flowchart is started by entering a transmission start command from the operating section 2.

When the transmission start command is given, the process goes to Step S1, where it is determined whether a memory transmission mode (the mode in which read-out original data is temporarily stored in the memory 6 and then transmitted therefrom) has been specified. If the memory transmission mode is specified, the process goes to Step S2, where the transmission process of encoding and transmitting the read-out original image is carried out. If it is determined in Step S1 that a read start mode has been specified, the process goes to Step S3, where the reader section 1 is given a command to set its read mode to the ultra fine mode and read image data from an original. In Step S4, the original image data read through the reader section 1 is stored in memory 6. In step S5, it is determined whether the reading of all the originals has been completed. If it is determined that the reading of them has not yet been completed, the process returns to Step S3. If it is determined that such reading has been completed, the process goes to Step S6, where it is determined whether an immediate transmission mode or a timer transmission mode has been selected. If it is determined that the immediate transmission mode has been selected, the process goes to Step S8, while, in the case of the timer transmission mode, the process goes to Step S7. In Step S7, the process waits until a specified transmission time. When the specified transmission time has been reached, the process goes to Step S8, where a transmission operation is started.

When the transmission operation is started, the process goes to Step S9, where the resolution of a facsimile apparatus on a destination side is determined. Such a resolution can be identified through a communication control procedure available in facsimile transmission. If the facsimile apparatus on the destination side is capable of receiving image data in the ultra fine mode, the process goes to Step S10, where the first page of the original to be transmitted is divided into n blocks each including a plurality of lines (refer to FIG. 4). Through Steps S11 to S13, optimum resolutions for the first to nth blocks are determined from the densities of the original images contained in the respective blocks. The process of determining such an optimum resolution will be explained in detail later with reference to the flowchart of FIG. 3.

When the resolutions of the original images in the respective first to nth blocks are determined, the process goes to Step S14, where it is determined whether the first to nth blocks of the first page include at least one block containing an image of a resolution corresponding to the ultra fine mode. If there is at least one block containing an image of a resolution corresponding to the ultra fine mode, the first page is transmitted in the ultra fine mode in Steps S15 and S16. When the first page is completely transmitted, the process goes to Step S17, where it is determined whether original image data to be transmitted next are stored in the memory 6. If original image data corresponding to the next page are stored in the memory 6, the process returns to Step S10, where the above-described process is executed.

If it is determined in Step S14 that there is no block of the resolution corresponding to the ultra fine mode, the process goes to Step S18, where it is determined whether the first to nth blocks of the second page to be transmitted include a block containing an image of a resolution corresponding to a fine mode. If there is a block of the resolution corresponding to the fine mode, the process goes to Step S19, where the resolution of image data is changed from the ultra fine mode to the fine mode in which the number of scanning lines is reduced by ½ in the main-scan direction, so the number of scanning lines in the sub-scan direction is reduced so that one line is read out at intervals of two lines. Through Steps S19 to S21, image data for the corresponding page are transmitted in the fine mode.

If it is determined in Step S18 that the first to nth blocks of the page to be transmitted include no block of the resolution corresponding to either the ultra fine mode or the fine mode, the process goes to Step S22, where the resolution of image data for that page is changed from the ultra fine mode to a standard mode in which the number of scanning lines is again reduced by ½ in the main-scan direction, so the number of scanning lines in the sub-scan direction is reduced so that one line is read out at intervals of four lines. Through Steps S23 and S24, image data for the page are transmitted in the standard mode. If it is determined in Step S17 that there is no page to be transmitted, the process goes to Step S25, where the transmission process is completed.

If it is determined in Step S9 that the facsimile apparatus on the destination side is unable to receive image data in the ultra fine mode, the process goes to Step S26, where it is determined whether reception is possible in the fine mode. If the reception in the fine mode is possible, the process goes to Step S27, where the resolution of each block of one page of the original image to be transmitted is calculated in a manner similar to that used in Steps S10 to S13 described above. If at least one of the first to nth blocks contains an image of a resolution corresponding to the fine mode, the process goes to Step S32, where the resolution of the image data for that page is changed from the ultra fine mode to the fine mode. Through Steps S32 to S35, the image data for that page are transmitted in the fine mode in a manner similar to that used in Steps S19 to S21.

If it is determined in Step S31 that none of the first to nth blocks contains a block of the resolution corresponding to the fine mode, the process goes to Step S36, where the resolution of the image data for the page is changed from the ultra fine mode to the standard mode in Steps S36 to S38, as in Steps S22 to S24.

If it is determined in Step S26 that the facsimile apparatus on the destination side is unable to receive image data even in the fine mode, the process goes to Step S40, where the resolution of the image data for the page is changed from the ultra fine mode to the standard mode. The image for that page is in turn transmitted in Steps S41 to S43 in the standard mode.

Figure 2A:
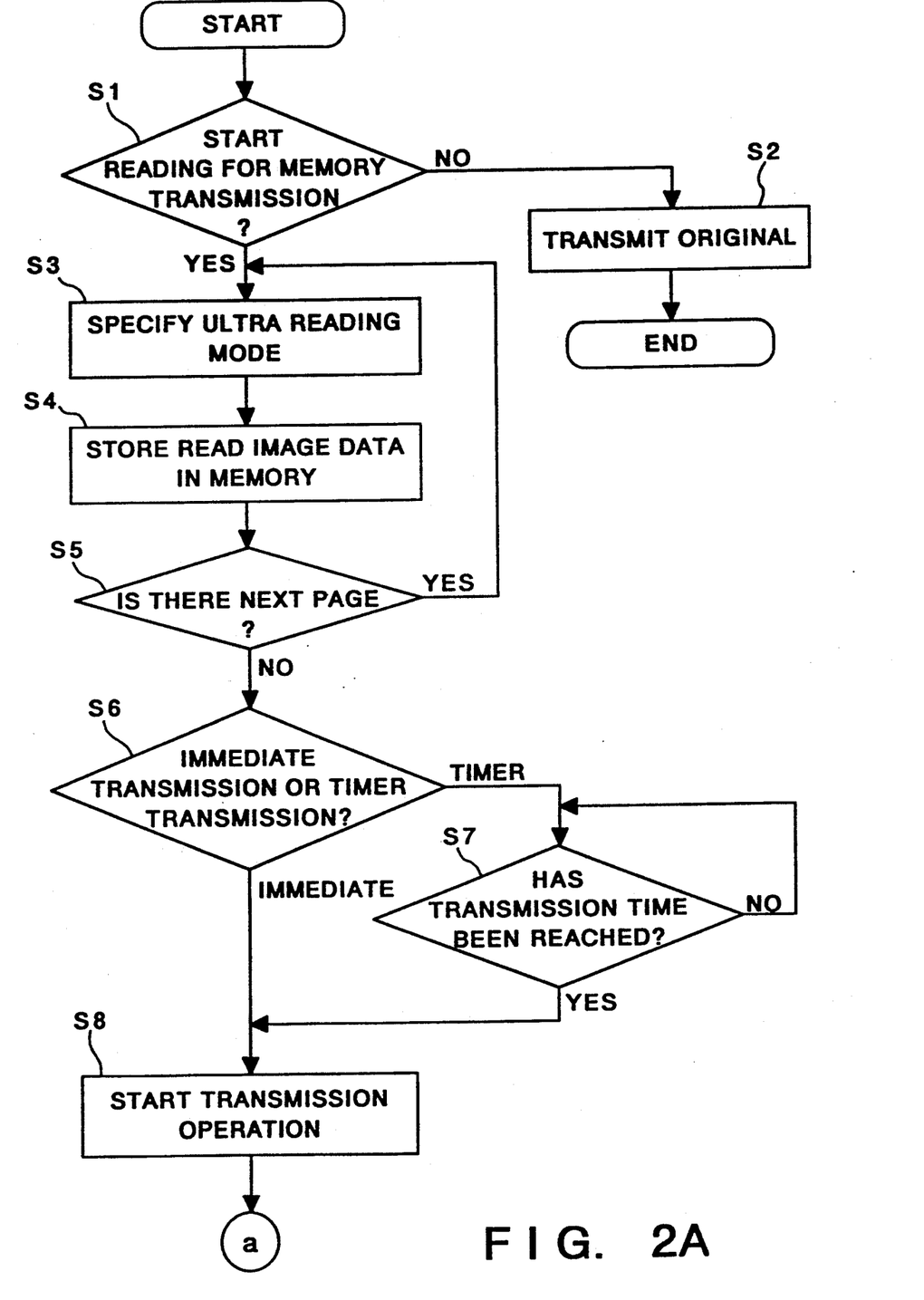
FIGS. 2A-2E are flowcharts showing a transmission process executed by the embodiment of the facsimile apparatus.
Figure 2B:
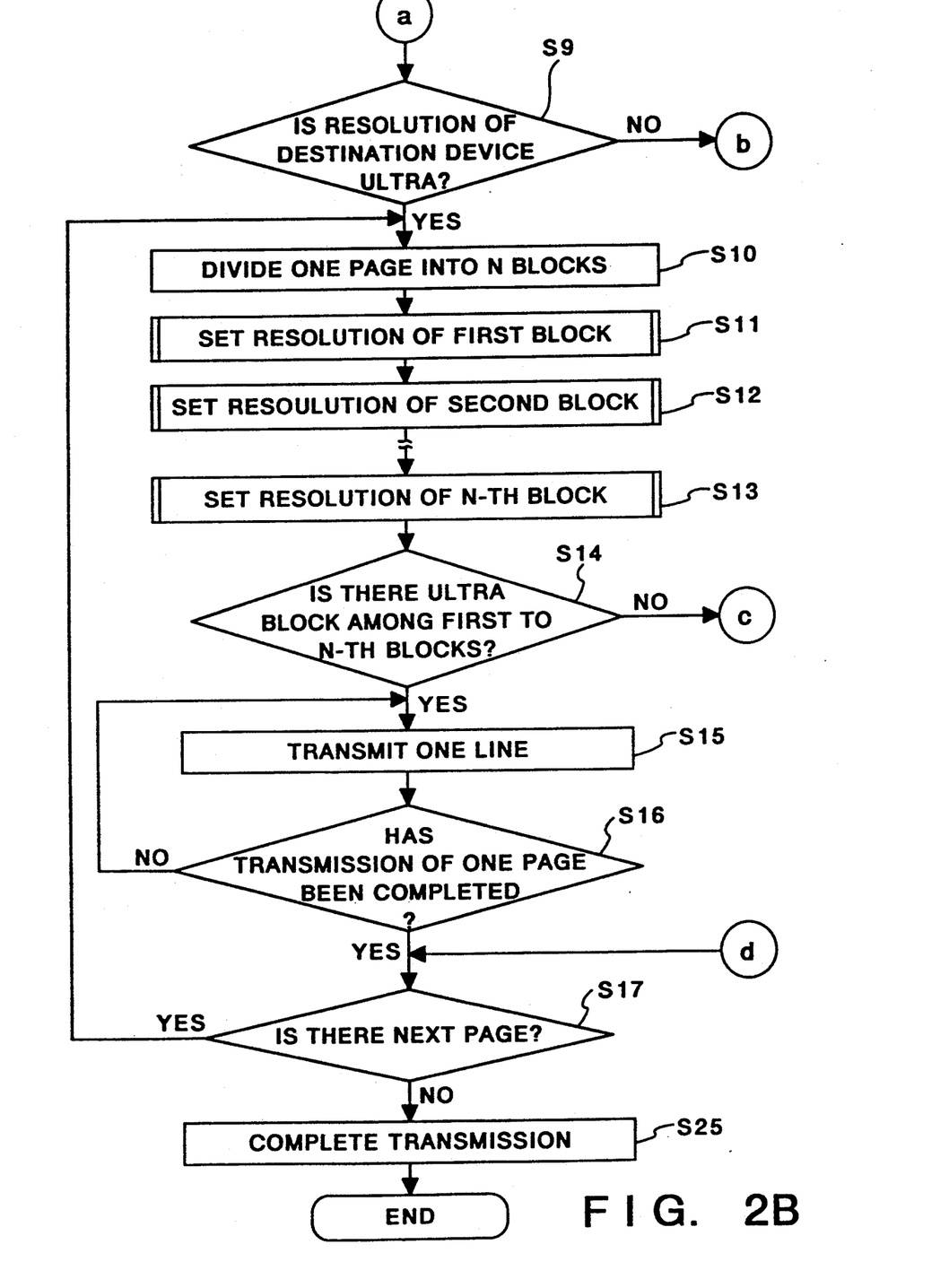
Figure 2C:
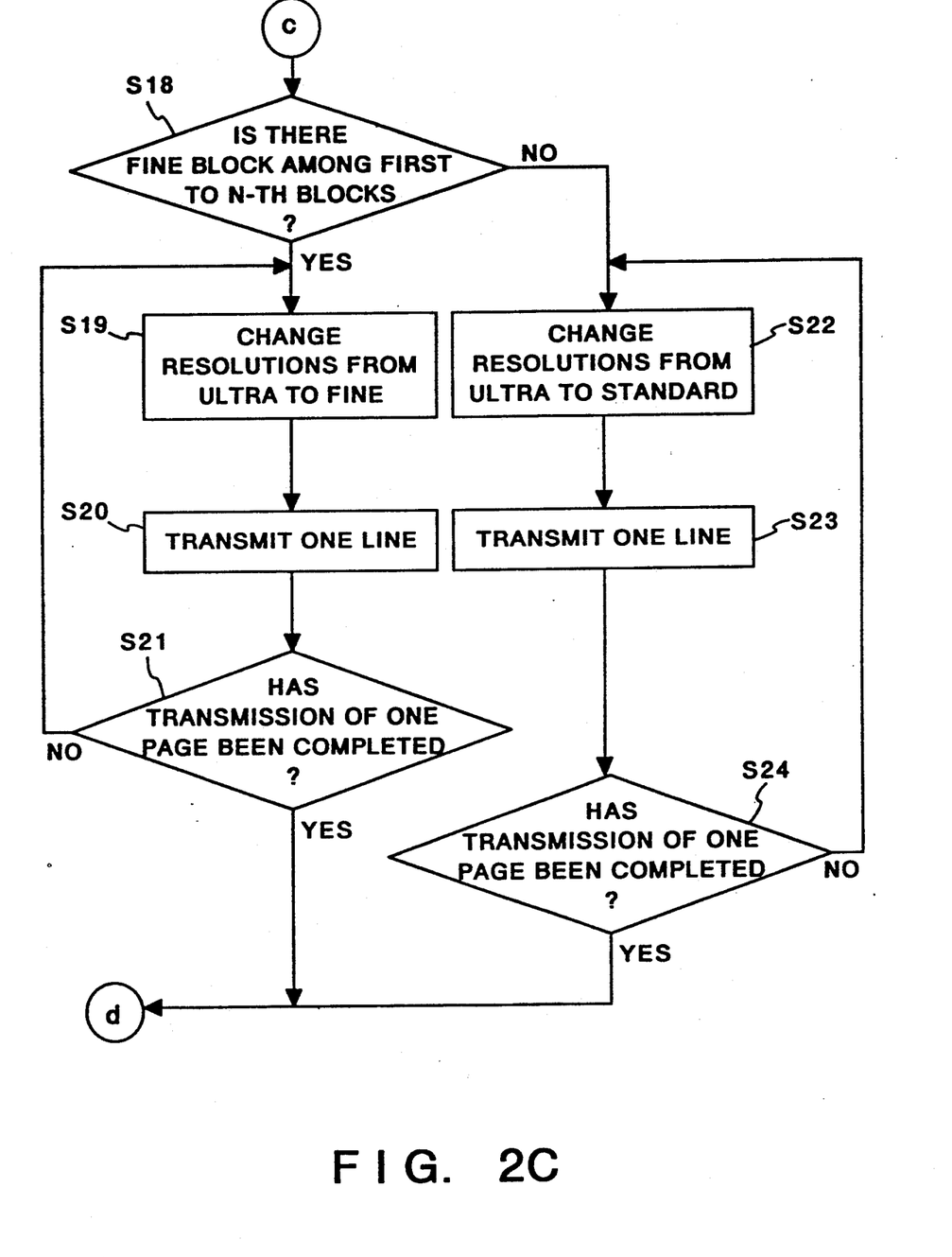
Figure 2D:
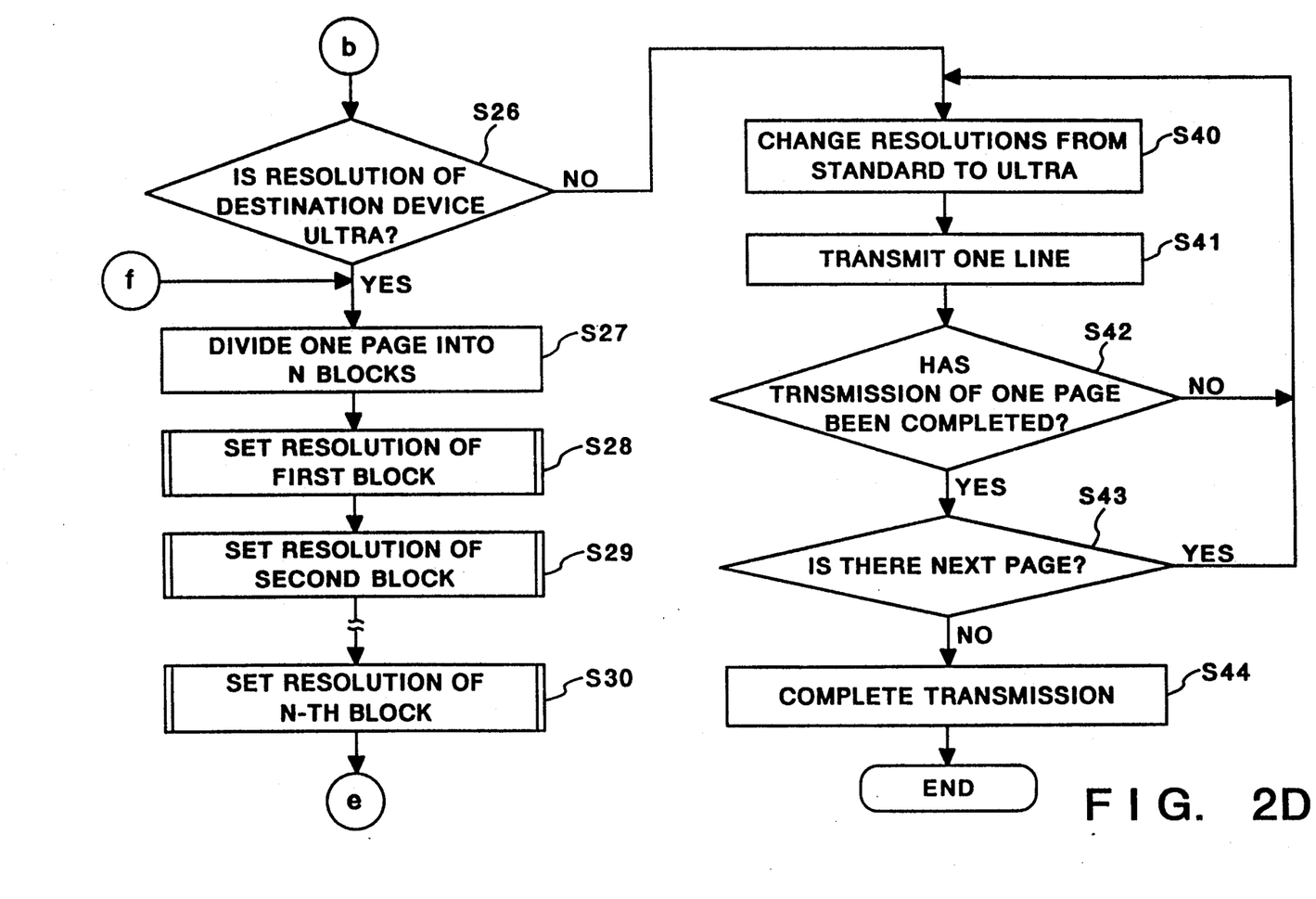
Figure 2E:
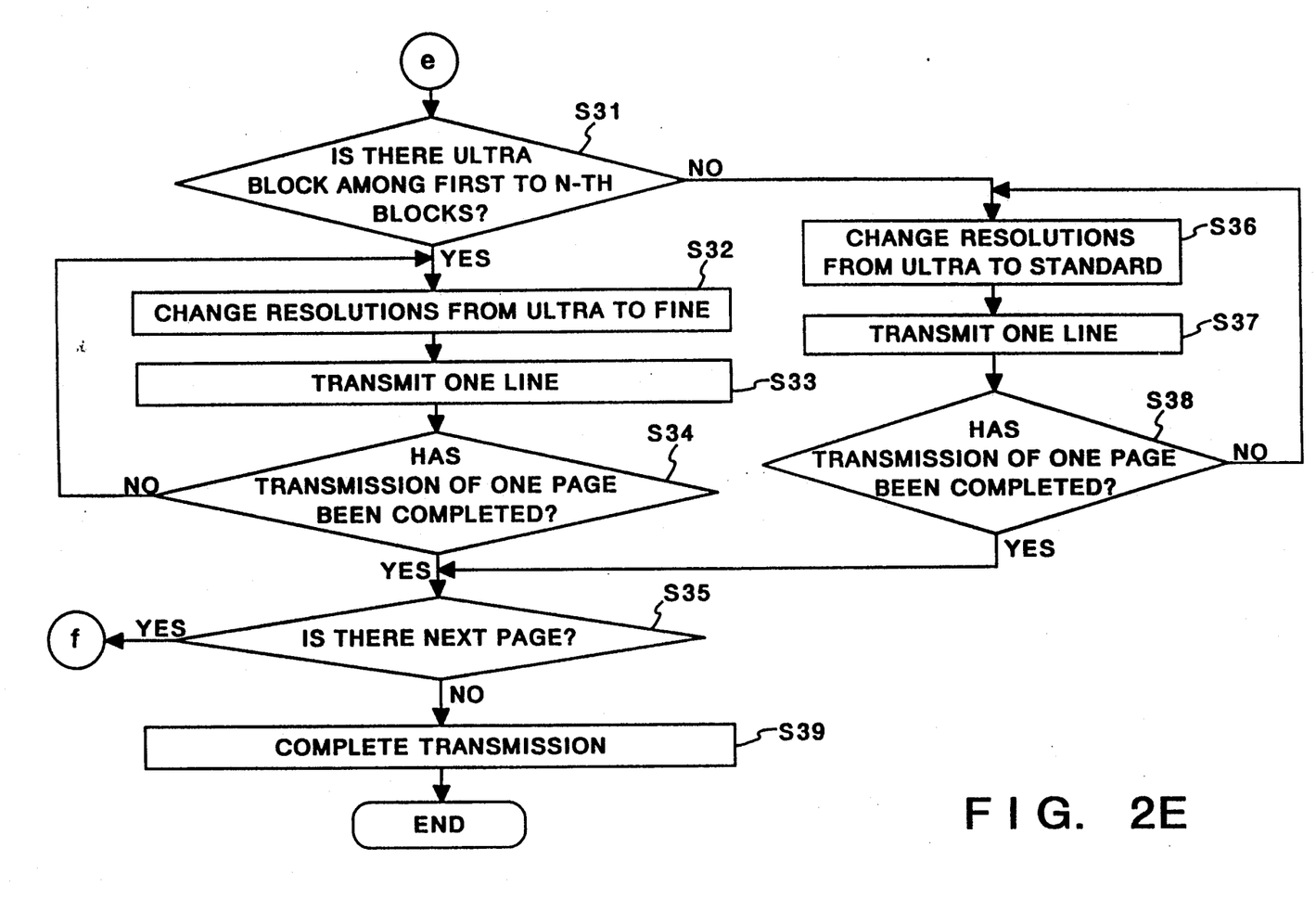
Figure 3A:
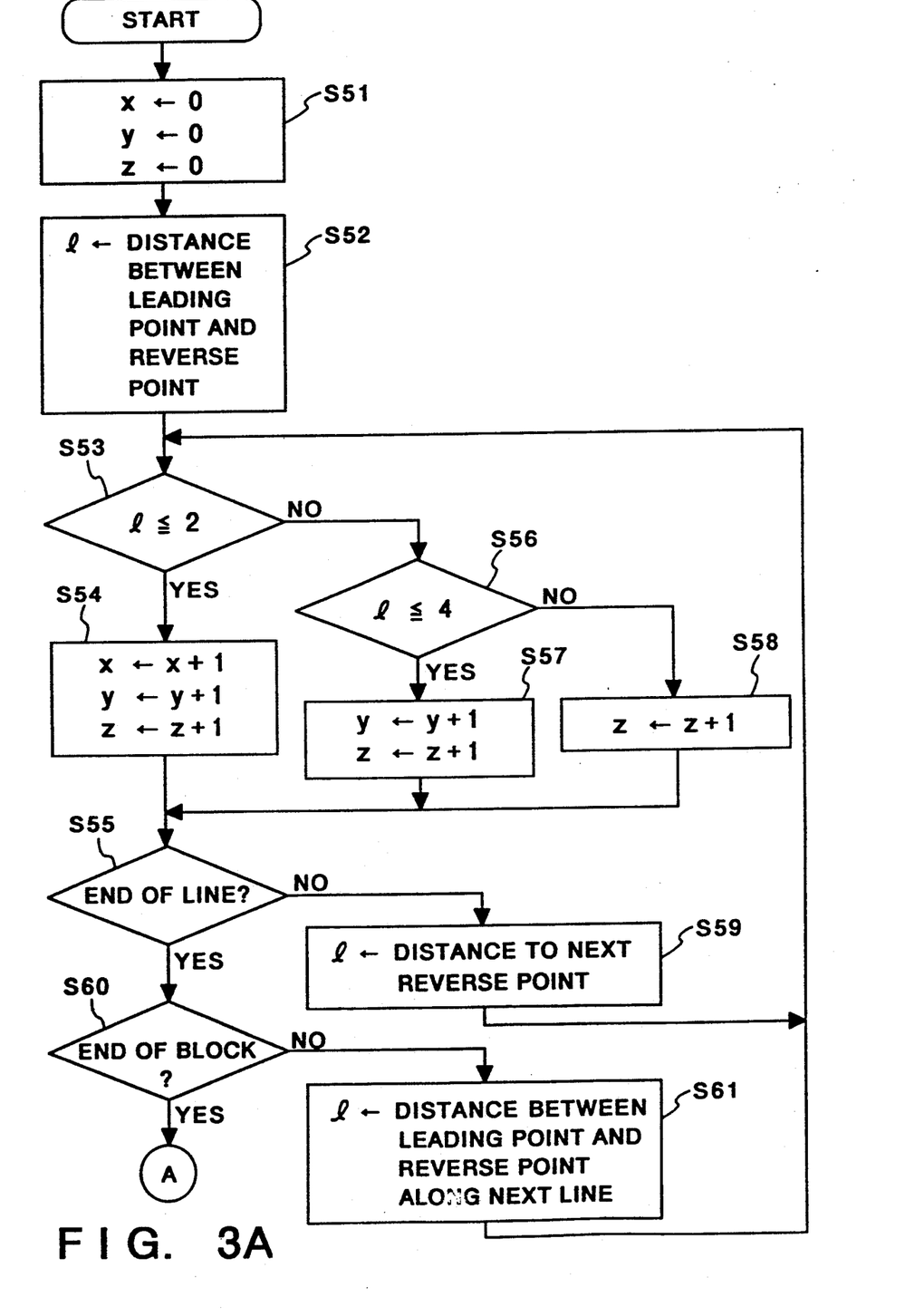
FIGS. 3A-3B are flowcharts showing the resolution-determining processes in FIG. 2.
Figure 3B:
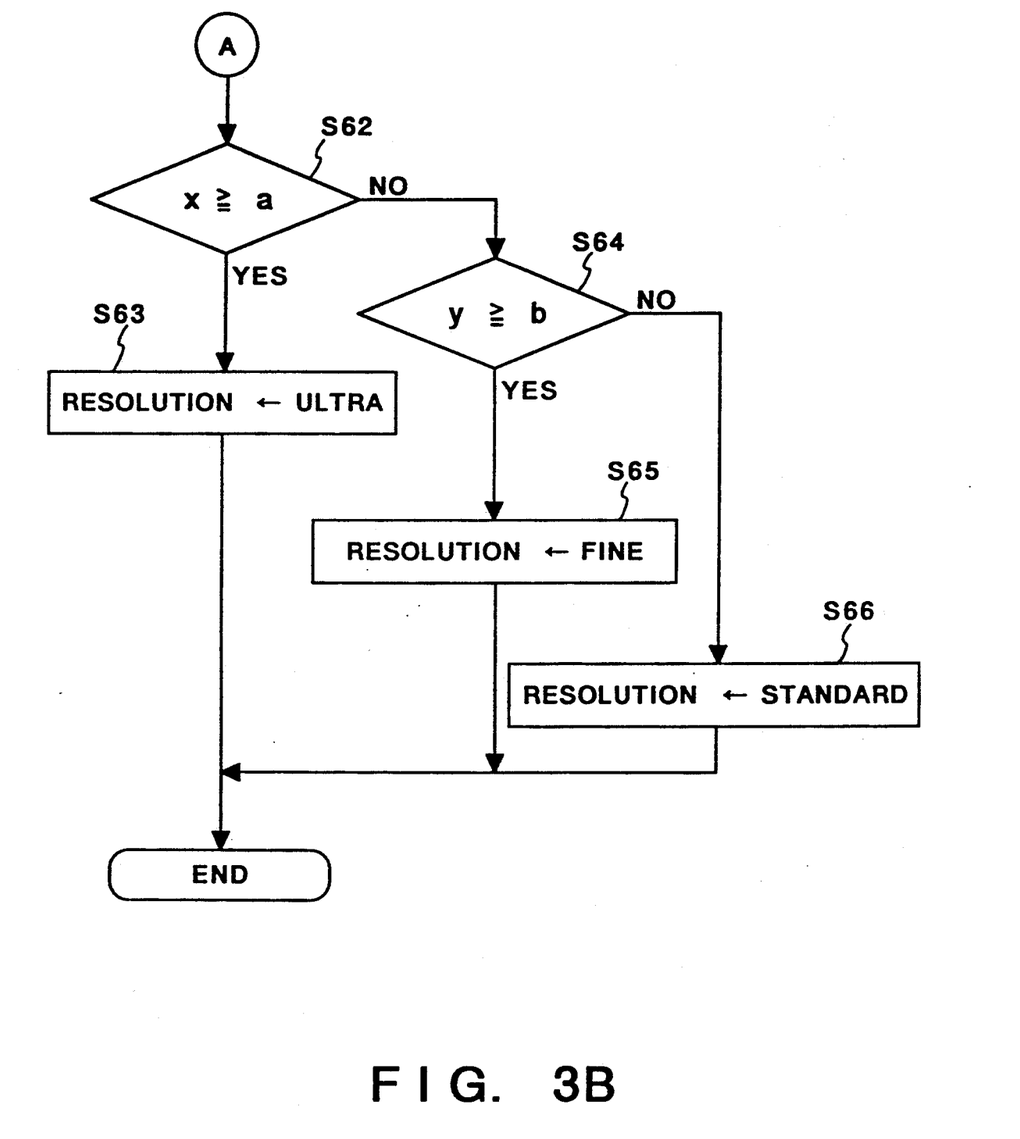
Figure 4:
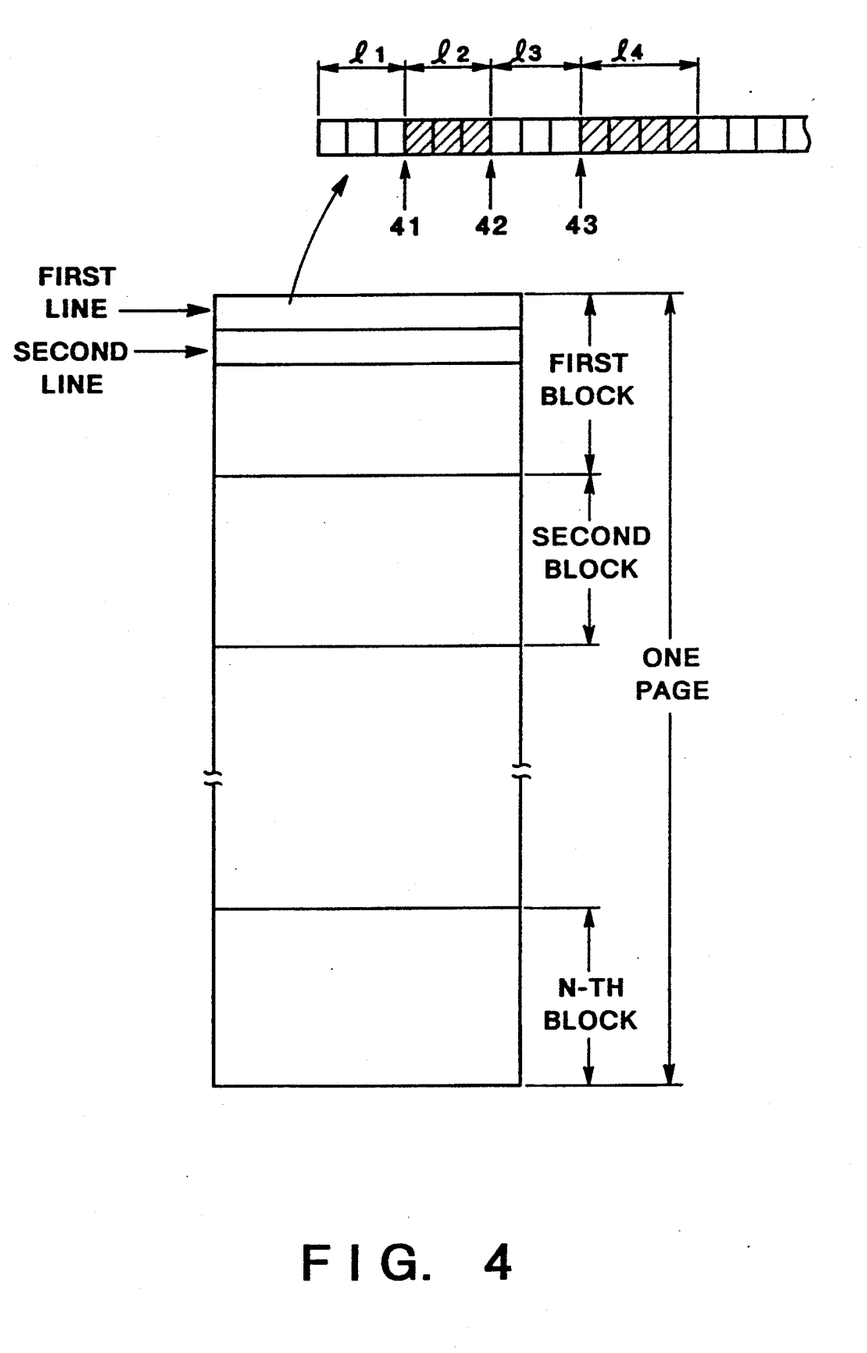
FIG. 4 is a diagram showing a block-division of a page of image data and a distance between reverse points in each line.

FIG. 3 is a flowchart showing the resolution-determining processes explained in connection with Steps S11 to S13 and S28 to S30 of FIG. 2. In this flowchart, the original image data for one page stored in the memory 6 is divided into n blocks as shown in FIG. 4, and the resolution for each block is obtained.

Initially, in Step S51, variables x, y and z are each reset to "0". In Step S52, the distance between the leading point and a reverse point at which image data is reversed is obtained and the result is set to l. As shown at 41 to 43 in FIG. 4, such a reverse point is a point at which the image data is changed from a pixel train of "0" to a pixel train of "1" or vice versa. Accordingly, in the case shown in FIG. 4, the distances $l_1$ to $l_4$ between the respective reverse points are represented as 3, 3, 3 and 4.

After the value of l is determined in this manner, the process goes to Step S53, where it is determined whether the value of l is not greater than 2. If l is not greater than 2, the process goes to Step S54, where the variables x, y, and z are each incremented by one. If l is greater than 2, the process goes to Step S56, where it is determined whether l is not greater than 4. If l is not greater than 4, the process goes to Step S57, where the variables y and z are each incremented by one. If l is greater than 4, the process goes to Step S58, where only the variable z is incremented by one. Then, the process goes to Step S55, where it is determined whether the end of the line of interest has been reached. If the end of the line has not yet been reached, the process goes to Step S59, where the distance l to the next reverse point is set, and the process returns to Step S53.

When the processing of the image data for the line has been completed, the process goes to Step S60, where it is determined whether all the lines in the block of interest have been examined. If all the lines have not yet been examined, the process goes to Step S61, where the distance l to the next reverse point is set, and the process returns to Step S53.

If it is determined in Step S60 that the processing of the block of interest has been completed, the process goes to Step S62, where it is determined that the value of the variable x is not less than a predetermined value a. Since the variable x is incremented for $1 \leq 2$, if the value of the variable x is not less than the predetermined value a, it means that the extent of variation in the image data is large, that is to say, the density of an image to be transmitted is high. The state of high density is hereinafter referred to simply as "dense". Accordingly, in this case, the resolution of the image data in the block is set to an ultra mode.

If the variable x is less than the predetermined value a, the process goes to Step S64, where it is determined whether the variable y is not less than a predetermined value b. If the variable y is not less then the predetermined value b, the process goes to Step S65, where the resolution of the image data in the block is set to the fine mode. Otherwise, the process goes to Step S66, where the resolution is set to the standard mode. Since the variable y is incremented for $2 < l \leq 4$, if the value of the variable x is less than the predetermined value a and the variable y is not less than the predetermined value b, it means that the extent of variation in the image data is medium, that is to say, the density of the image to be transmitted is medium. If the value of the variable x is less than the predetermined value a and the variable y is less than the predetermined value b, it means that the extent of variation in the image data is small, that is to say, the density of the image to be transmitted is low. This state of low density is hereinafter referred to simply as "coarse".

The values of these values a and b are appropriately set on the basis of the count of the variable z, and assumes the relationship $a > b$.

In the case of certain kinds of images, an original image to be transmitted may include a dense or coarse part which expands over a plurality of divided blocks. For this reason, if a particular line is encountered which includes a large number of reverse points spaced apart from each other by short distances, the resolution of the image may be determined depending on how many lines including reverse points which are spaced apart by short distances are contained in n lines subsequent to the particular line. If there is no dense part, the resolution may be kept low until a dense part is encountered, and when a line having a large number of coarse parts is encountered, the aforesaid processing may be executed.

As is apparent from the foregoing, in the first embodiment, the degree of resolution is automatically determined on the basis of the density of an original image conveyed by image data. Accordingly, it is possible to transmit the original image data having an optimum resolution at which a facsimile apparatus on the destination side can satisfactorily receive and reproduce the original image data.

Figure 5:
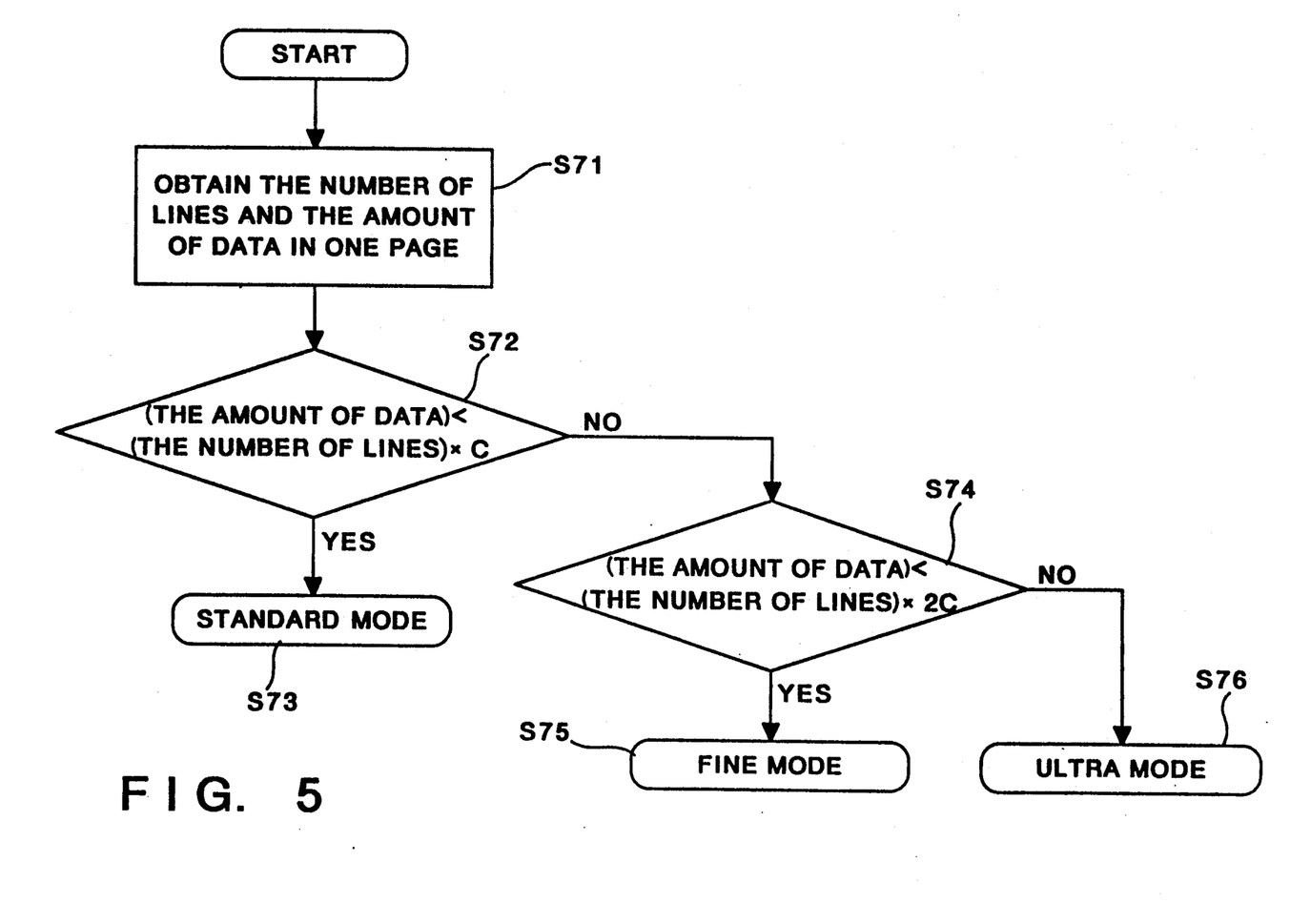
FIG. 5 is a flowchart showing a method of determining resolution according to another embodiment.

Second Embodiment (FIG. 5)

FIG. 5 is a flowchart showing a method of determining resolution according to the second embodiment. The illustrated processing is started in a state where original image data for at least one particular page is stored in memory 6.

In Step S71, a number of lines which form the image data of the page and an amount of image data in the same page are obtained on the basis of the original image data of that page. The amount of image data is obtained from the difference between the leading and trailing addresses of the image data of the page. Then, in Step S72, it is determined whether the amount of image data is less than or equal to (the number of lines×C), where C is a predetermined value.

If the amount of data is less than (the number of lines×C), it is determined that the density of the image in one line is low, and in Step S73, the standard mode is selected. If the amount of data is less than (the number of line×2C), the process goes to Step S75, where it is determined that the resolution of the image data corresponds to the fine mode. If it is determined in Step S74 that the amount of data is greater than (the number of lines×2C), the process goes to Step S76, where the resolution of the image data of the page of interest corresponds to the ultra mode.

In the second embodiment described above, in the memory transmission mode, the resolution of image data is automatically determined in accordance with the magnitude of memory capacity, so an operator does not need to manually set the degree of resolution which corresponds to each original image.

Further, the resolution of the image to be transmitted can be adequately determined in accordance with whether an original image is coarse or dense and the degree of resolution ability of the communication device installed on the destination side. Accordingly, it is possible to transmit the original image at an appropriate resolution. It is also possible to reduce the time required for communication and hence, costs associated with communication.

As is apparent from the foregoing, in accordance with the present invention, the resolution of an original image to be transmitted can be automatically determined so that it is possible to transmit an original image at an optimum resolution which corresponds to the resolution of a communication device installed on the destination side.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation possible so as to encompass all such modifications and equivalent structures and functions.

What is claimed is:

1. A facsimile apparatus comprising:
   inputting means for inputting an original image at a maximum transmittable resolution;
   storage means for storing image data corresponding to the original image inputted from said inputting means;
   determining means for determining whether a density of the image data stored in said storage means is coarser or denser than a predetermined density; and
   transmitting means for converting the resolution of the image data stored in said storage means on the basis of the result of the determining by said determining means and for transmitting the image data with said converted resolution.

2. A facsimile apparatus comprising:
   inputting means for inputting an original image at a maximum transmittable resolution;
   storage means for storing image data corresponding to the original image inputted from said input means;
   density determining means for determining a density of the image data stored in said storage means;
   resolution determining means for determining a maximum resolution of a communication device on a reception side; and
   transmitting means for converting the resolution of the image data stored in said storage means on the basis of the density of the image data determined by said density determining means and the maximum resolution of said communication device determined by said resolution determining means, and for transmitting the image data with the converted resolution.

3. A facsimile apparatus according to claim 2, wherein said transmitting means is provided with converting means arranged to convert the resolution of said image data into the maximum resolution of said communication device if the resolution of said image data stored in said storage means differs from the maximum resolution of said communication device.

4. A facsimile apparatus according to claim 2, wherein said density determining means determines the density of said image data on the basis of the number of lines in said image data, each of which includes reverse points spaced apart from each other by a distance smaller than a predetermined value.

5. A facsimile apparatus according to claim 2, wherein said density determining means determines the density of said image data by comparing the amount of data in said image data with a predetermined value.

6. A facsimile apparatus comprising:
   reading means for reading an original image at a maximum transmittable resolution;
   determining means for making a decision as to whether image data read by said reading means is coarse or dense;
   detecting means for detecting a resolution which can be processed by a communication device on a reception side; and
   transmitting means for converting the resolution of said image data read by said reading means on the basis of the result of said decision made by said determining means and said resolution detected by said detecting means and then for transmitting said image data with said converted resolution.

7. A facsimile apparatus according to claim 6, further comprising storage means for storing image data read by said reading means.

8. A facsimile apparatus according to claim 6, further comprising resolution determining means for determining the maximum resolution of said communication device installed on said reception side,
   wherein said transmitting means transmits said image data to said communication device at a resolution based on the density of said image data determined by said density determining means and the maximum resolution of said communication device determined by said resolution determining means.

9. A facsimile apparatus according to claim 7, wherein said transmitting means is provided with converting means for converting the resolution of said image data into the maximum resolution of said communication device if the resolution of said image data stored in said storage means differs from the maximum resolution of said communication device.

10. An image communication method comprising the steps of:
   reading an original image at a maximum transmittable resolution;
   determining whether a density of image data read in said reading step is coarser or denser than a predetermined density;
   detecting a resolution capable of being processed by a communication device on a reception side;
   converting the resolution of the image data read in said reading step on the basis of the result of the determination in said determining step and the resolution detected in said detecting step; and
   transmitting the image data with the converted resolution.

* * * * *

UNITED STATES PATENT AND TRADEMARK OFFICE
CERTIFICATE OF CORRECTION

PATENT NO. : 5,075,784
DATED : December 24, 1991
INVENTOR(S) : MASANORI MOMOSE

It is certified that error appears in the above-identified patent and that said Letters Patent is hereby corrected as shown below:

On the Title page, item [57], Abstract:

Line 4, "munication installed" should read
    --munication device installed--.

SHEET 3 OF 10

FIG. 2B, "RESOULUTION" should read --RESOLUTION--.

COLUMN 6

Line 18, "then" should read --than--.
    Line 37, "sumes" should read --sume--.

COLUMN 7

Line 11, "linex2C)," should read --linesx2C),--.
    Line 65, "determining" should read --determination--.

Signed and Sealed this

Twentieth Day of July, 1993

Attest:

MICHAEL K. KIRK

*Attesting Officer*     *Acting Commissioner of Patents and Trademarks*